United States Patent [19]
Inoue

[11] Patent Number: 4,521,328
[45] Date of Patent: Jun. 4, 1985

[54] METHOD OF MAKING CARBON MATERIAL

[75] Inventor: Kiyoshi Inoue, Tokyo, Japan

[73] Assignee: Inoue-Japax Research Incorporated, Yokohama, Japan

[21] Appl. No.: 290,778

[22] Filed: Aug. 6, 1981

[30] Foreign Application Priority Data

Aug. 11, 1980 [JP] Japan ................... 55-109150

[51] Int. Cl.³ .............................. H01B 1/02
[52] U.S. Cl. ..................... 252/502; 423/447.6; 423/460; 427/39; 427/54.1; 428/408

[58] Field of Search ............... 252/502; 423/447.6, 423/447.1, 447.7, 445, 460; 427/39, 54.1, 114, 227; 428/408

[56] References Cited

U.S. PATENT DOCUMENTS 4,055,628  10/1977  McCarroll et al. .............. 423/447

Primary Examiner—Josephine Barr
Attorney, Agent, or Firm—Karl F. Ross; Herbert Dubno

[57] ABSTRACT

A carbon material having oxygen impregnated therein, the oxygen being present in an amount of 10 to 100 ppm in the carbon material.

8 Claims, 3 Drawing Figures

METHOD OF MAKING CARBON MATERIAL

FIELD OF THE INVENTION

The present invention relates generally to a method of making carbon materials and, more particularly, to a novel carbon material having improved heat-resistant and oxidation-resistant properties and useful for forming EDM (electrical discharge machining) electrodes, electrical conducting brushes, oil seals and other carbon articles.

BACKGROUND OF THE INVENTION

A carbon material may be prepared by loading a mass of carbon particles in a mold and compression-molding the mass or sintering the mass in the mold under pressure. The carbon particles may be mixed with a binder to form the mass. Sintering may be achieved by passing a resistive-heating current across the mass between a pair of electrodes which are driven towards one another to compress the mass. Resistive heating may be replaced by induction heating. Carbon materials have many fields of application.

OBJECTS OF THE INVENTION

It is an important object of the present invention to provide a carbon material having improved heat-resistant and oxidation-resistant properties and suitable for use in EDM electrodes, brushes and seals.

Another important object of the invention is to provide a new and useful carbon material which has a greater thermal conductivity for a given electrical resistivity than conventional carbon materials.

Another important object of the invention is to provide a new and useful carbon material having a greater electrical resistivity for a given thermal conductivity than conventional carbon materials.

Another important object of the invention is to provide a new and useful carbon material having a greater ratio of electrical resistivity to thermal conductivity than conventional carbon materials.

Another important object of the invention is to provide a carbon material having a ratio of electrical resistivity to thermal conductivity in excess of 1000 where electrical resistivity is expressed in terms of microohm.cm and thermal conductivity is expressed in terms of cal/cm.sec. °C.

A further important object of the invention is to provide a method of the manufacture of such a carbon material.

SUMMARY OF THE INVENTION

The present invention provides in a first aspect thereof a novel carbon material having oxygen impregnated therein, the oxygen being present in the carbon material in an amount of 10 to 1000 ppm. The novel carbon material is suitable for use in an article which requires oxidation-resistance and/or heat-resistance. The novel carbon material is especially suitable for use in an EDM electrode, an electrical conducting brush or a seal (e.g. oil seal).

The present invention also provides in a second aspect thereof a method of the manufacture of a carbon material, which method comprises the steps of (a) sintering a mass of carbon particles to form the material and, prior to step (a), (b) impregnating the carbon particles with oxygen at a proportion of 10 to 1000 ppm. The step (b) may be carried out by treating the carbon particles with a stream of ozone for a predetermined time. The step (b) may also be carried out by subjecting the carbon particles to a glow discharge or an ultraviolet radiation in the presence of oxygen (e.g. in air).

The carbon particles may be particles of a petroleum coke which are mixed with a tar prior to step (b). The coke particles while being mixed with the tar may be impregnated with oxygen.

The carbon particles may be so treated as to form an oxide layer of a thickness in the angstrom order on each individual particle.

The carbon particles may also be prepared by pulverizing a fiber carbon. A carbon fiber may be prepared by drawing a heated carbon precursor such as furan or phenol. The carbon particles with oxygen impregnated therein may then be prepared by subjecting the carbon fiber being drawn to a glow discharge or ultraviolet radiation in the presence of oxygen.

BRIEF DESCRIPTION OF THE DRAWING

These and other objects and features of the present invention as well as advantages thereof will become more readily apparent from the following description taken with reference to the accompanying drawing in which.

SPECIFIC DESCRIPTION

Carbonaceous particles of a petroleum coke of particles sizes ranging between 3 and 5 microns and 6% by weight a tar having a vaporization temperature of 200° C. are mixed together to form a mass. The mass is uniformly kneaded at a temperature of 150° C. while being exposed to a stream of ozone. Such masses are then sintered under a given heat and pressure condition to produce three samples No.1, No.2 and No.3 of the novel carbon material. Samples No.1, No.2 and No.3 are carbon materials sintered from masses which during kneading are exposed to ozone for periods of 3 hours, 1 hour and 10 minutes, respectively. The electrical and thermal characteristics of these samples are measured and plotted and marked with No.1, No.2 and No.3, respectively, in the graph of FIG. 1 in which specific resistance (microohn.cm) is plotted along the ordinate and thermal conductivity (Kcal/meter, hour, °C.) is plotted along the abscissa. In the graph, the curve C (straight line) represents the electrical and thermal characteristic of the conventional carbon material sintered from a mass which is simply kneaded without exposure to ozone. The curve C is drawn by gathering measurements of a number of such masses sintered under varying pressure conditions to yield varying thermal conductivities or specific resistances and then the specific resistances or thermal conductivities of these samples are measured and plotted in the graph together with their respective thermal conductivities or specific resistances.

The samples for the curve C contain no appreciable amount of oxygen whereas the samples No.1, No.2 and No.3 grouped as A contain oxygen contents ranging between 10 and 100 ppm.

Figure 2:
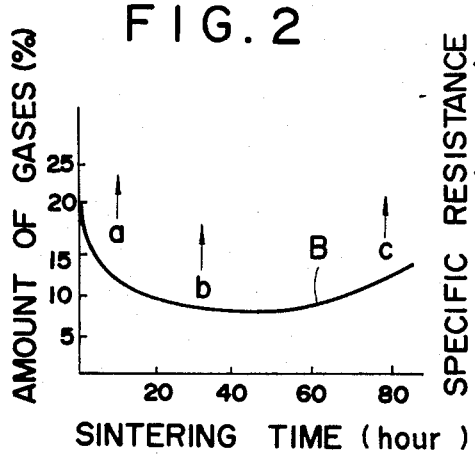
FIG. 2 is a graph illustrating how gases are generated in the course of a sintering operation for preparing a carbon material according to the present invention.

It has also been found that in the course of the sintering operation for preparing a sample No.1, No.2 or No.3, the total amount (100%) of gases is generated in proportions as time elapses as shown by curve B in the graph of FIG. 2. The sintering temperature is held at 320° C. It is seen that 20% of the total amount of gases is evolved quickly after initiation of the heating. Then the amount of gases decreases gradually as time elapses. It again increases after lapse of 60 hours. It has further been found that the gases evolved consist mostly of hydrocarbons b initially, hydrogen c after lapse of 20 hours and finally oxygen after lapse of 80 hours. This indicates that quicker heating is advantageous to maintain the oxygen content entrapped in the carbon material sintered and that the carbon should be more quickly graphitized, preferably within 20 hours.

The desired impregnation of carbon particles with oxygen in accordance with the present invention is preferably achieved by subjecting carbonaceous particles to a glow discharge or an ultraviolet radiation in the presence of oxygen (e.g. in air). It has been found that this causes efficient formation of ozone and is capable of creating an oxide film of a thickness in the angstrom order on each individual carbonaceous particle. The carbonaceous particles may also be prepared by pulverising a fiber carbon. The carbon fiber may be prepared by drawing a heated carbon precursor, e.g. furan or phenol. The carbonaceous particles with oxygen impregnated therein may then be prepared by subjecting the carbon fiber being drawn to a glow discharge or an ultraviolet radiation in the presence of oxygen.

Figure 1:
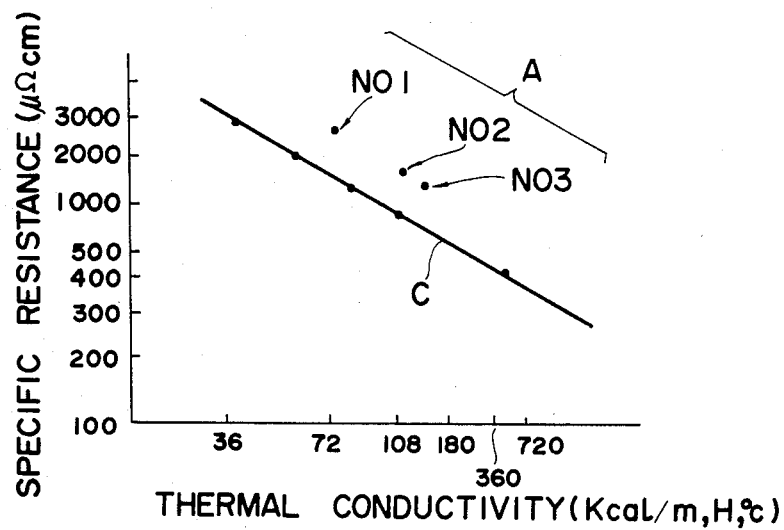
FIG. 1 is a graph illustrating relationship between electrical resistivity and thermal conductivity of samples of a carbon material according to the present invention compared with that of samples of a conventional carbon material.
Figure 3:
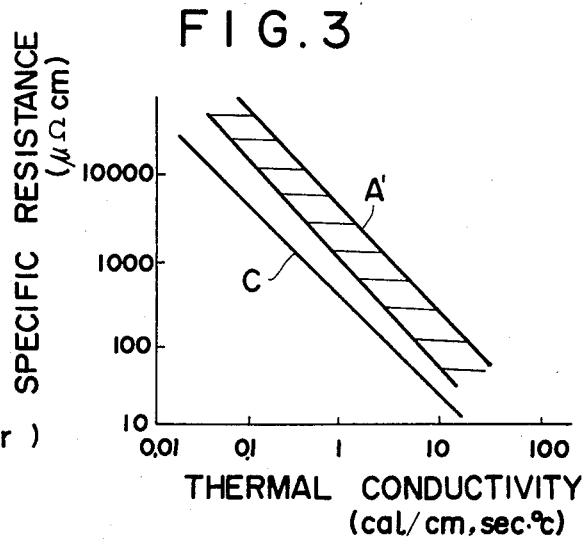
FIG. 3 is a graph illustrating relationship between electrical resistivity and thermal conductivity of samples of another carbon material prepared according to the present invention compared with that of samples of a conventional carbon material.

FIG. 3 shows a graph which is similar to that of FIG. 1 and in which specific resistivity in terms of microohm-cm is plotted along the ordinate and thermal conductivity in terms of cal/cm.sec. °C. is plotted along the abscissa. The graph of FIG. 3 shows electrical and thermal characteristics of carbon materials A' sintered after the glow-discharge exposure or ultraviolet radiation treatment, according to the invention, compared with electrical and thermal characteristics of conventional carbon materials C. The carbon materials A' contain oxygen impregnated therein at proportions ranging from 10 to 1000 ppm.

While graphite theoretically has a specific resistance of $40 \times 10^{-6}$ ohm.cm, graphite carbon materials industrially obtained have greater values of specific resistance ranging from 100 to $1000 \times 10^{-6}$ ohm.cm. According to the present invention, a graphitized carbon material is obtainable which has a specific resistance ranging between 1000 and $10000 \times 10^{-6}$ ohm.cm.

In general, there exists a proportional relationship between specific resistance $\alpha$ and thermal conductivity $\beta$ as follows $$\alpha = \beta K \qquad (1)$$

where k is a constant. Where $\alpha$ is expressed in terms of $\mu\Omega.\text{cm}$ and $\beta$ is expressed in terms of cal/cm.sec. °C., $k=300$ with conventional carbon materials and $k \geq 1000$ with carbon materials according to the present invention.

It has also been that the amount of oxygen impregnated in the carbon material according to the present invention can effectively be regulated to establish a desired value of any of various physical properties of the carbon material such as friction coefficient, electric resistivity, hardness and degree of graphitization.

What is claimed is:

1. A method for the manufacture of an oxygen-impregnated carbon material, comprising the steps of:
   (a) impregnating carbonaceous particles with oxygen in an amount of 10 to 1000 ppm by subjecting said particles to a stream of ozone for a predetermined time period; and
   (b) sintering a mass of the oxygen-impregnated carbonaceous particles to form said material.

2. A method for the manufacture of an oxygen-impregnated carbon material, comprising the steps of:
   (a) impregnating carbonaceous particles with oxygen in an amount of 10 to 1000 ppm by subjecting said particles to a glow discharge in the presence of oxygen; and
   (b) sintering a mass of the oxygen-impregnated carbonaceous particles to form said material.

3. A method for the manufacture of an oxygen-impregnated carbon material, comprising the steps of:
   (a) impregnating carbonaceous particles with oxygen in an amount of 10 to 1000 ppm by subjecting said particles to ultraviolet radiation in the presence of oxygen; and
   (b) sintering a mass of the oxygen-impregnated carbonaceous particles to form said material.

4. A method according to claim 1, claim 2 or claim 3 wherein said particles comprise petroleum coke which are impregnated with oxygen while being mixed with tar.

5. A method according to claim 1, claim 2 or claim 3 wherein said particles are prepared by pulverizing a carbon fiber which has been prepared by drawing a heated carbon predecessor.

6. A method according to claim 5 wherein said particles are impregnated with oxygen by subjecting said carbon fiber being drawn to a glow discharge.

7. A method according to claim 5 wherein said particles are impregnated with oxygen by subjecting said carbon fiber being drawn to ultraviolet radiation.

8. A method according to any one of claim 1, claim 2 or claim 3 wherein said particles are so treated as to form an oxide layer on each individual particle.

* * * * *